United States Patent
Krause

(10) Patent No.: US 12,531,408 B2
(45) Date of Patent: Jan. 20, 2026

(54) DISCONNECT DETECTION CIRCUITRY FOR UNIVERSAL SERIAL BUS (USB) COMPLIANT ELECTRONIC DEVICES

(71) Applicant: Apple Inc., Cupertino, CA (US)

(72) Inventor: Christine M. Krause, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 18/371,255

(22) Filed: Sep. 21, 2023

(65) Prior Publication Data
US 2024/0106230 A1      Mar. 28, 2024

Related U.S. Application Data

(60) Provisional application No. 63/409,555, filed on Sep. 23, 2022.

(51) Int. Cl.
*H02H 7/22* (2006.01)
*G01R 31/54* (2020.01)
*H02H 1/00* (2006.01)

(52) U.S. Cl.
CPC .............. *H02H 7/22* (2013.01); *G01R 31/54* (2020.01); *H02H 1/0007* (2013.01)

(58) Field of Classification Search
None
See application file for complete search history.

(56) References Cited

U.S. PATENT DOCUMENTS

| 2012/0311359 A1* | 12/2012 | Jaramillo | H04L 25/0298 713/321 |
| 2021/0034563 A1* | 2/2021 | Khan. P | G06F 13/4081 |

* cited by examiner

*Primary Examiner* — Farley Abad
*Assistant Examiner* — Dayton Lewis-Taylor
(74) *Attorney, Agent, or Firm* — Sterne, Kessler, Goldstein & Fox P.L.L.C.

(57) ABSTRACT

Systems, methods, and apparatuses can detect whether an electrical cable between a source device and a sink device has become disconnected. The source device and/or the sink device can be compliant with a version of a Universal Serial Bus (USB) standard, for example, USB 3.x. These systems, methods, and apparatuses can monitor peak voltage swings of data signals flowing between the source device and the sink device. The peak voltage swing of these data signals can be at a first value when the electrical cable is connected to the source device and the sink device or at a second value greater than the first value when the electrical cable is disconnected from the source device or the sink device. The peak voltage swing can switch from the first value to the second value in response to the electrical cable being disconnected from the source device or the sink device. As such, these systems, methods, and apparatuses can determine that the electrical cable has become disconnected from the source device or the sink device in response to detecting the second value for the peak voltage swing of the data signals flowing from the source device to the sink device.

20 Claims, 8 Drawing Sheets

DISCONNECT DETECTION CIRCUITRY FOR UNIVERSAL SERIAL BUS (USB) COMPLIANT ELECTRONIC DEVICES

CROSS-REFERENCE TO RELATED APPLICATIONS

The present application claims the benefit of U.S. Provisional Patent Application No. 63/409,555, filed Sep. 23, 2022, which is incorporated herein by reference in its entirety.

BACKGROUND

Electrical cables are various assemblies of copper wires running side by side or bundled together to carry data signals and/or power between mechanical, electrical, or electromechanical devices. These electrical cables often include various conductors, insulations, screens, and/or protective covering. Electrical cables may be made more flexible by stranding, twisting, and/or braiding the copper wires running inside them to produce larger copper wires that are more flexible than solid copper wires of similar size. The copper wires can be plated with a thin layer of a metallic element, compound, or mixture, such as tin but sometimes gold, silver or some other material. Often times, the electrical cables are mechanically connected to various male connectors, or plugs, that can be connected to various female connectors, or receptacles, mounted within these mechanical, electrical, or electromechanical devices. However, in some situations, the electrical cables can become disconnected, by for example, being pulled out by mistake, becoming frayed and breaking, or simply failing.

SUMMARY OF DISCLOSURE

Some embodiments of this disclosure describe a source device for communicating with a sink device over an electrical cable. The source device can include a signal source circuit and a re-driver circuit. The signal source circuit can provide an input data signal for transmission to the sink device. The re-driver circuit can equalize and amplify the input data signal to provide an output data signal for transmission to the sink device and can power down the source device in response to detecting the electrical cable has become disconnected.

In these embodiments, the source device and the sink device can be complaint with a version of a Universal Serial Bus (USB) standard or protocol. In these embodiments, the version of the USB standard can include USB 3.x.

In these embodiments, the re-driver circuit can include detection circuitry and a logical state machine. The detection circuitry can measure a peak voltage swing of the output data signal and provide a disconnection detect signal at a first logical level to indicate that the source device is connected to the sink device when the output data signal is at a first value or provide the disconnection detect signal at a second logical level to indicate that the source device is disconnected from the sink device when the output data signal is at a second value that is greater than the first value. The logical state machine can cause the source device to enter into or maintain an active link state in response to the disconnection detect signal being at the first logical level or to power down the source device in response to the disconnection detect signal being at the second logical level. In these embodiments, the active link state can include a link state U0 of a version of a Universal Serial Bus (USB) standard. In these embodiments, the logical state machine can cause the source device to enter into a power-down mode of operation to power down the source device in response to the disconnection detect signal being at the second logical level.

In these embodiments, the re-driver circuit can include a logical state machine that can power down one or more components of the re-driver circuit in response to detecting the electrical cable has become disconnected.

Some embodiments of this disclosure describe a re-driver circuit that is compliant with a version of a Universal Serial Bus (USB) standard. The re-driver circuit can include a first signal pathway, a second signal pathway, and a logical state machine. The first signal pathway can transmit an output data signal to a USB compliant sink device in accordance with the version of the USB standard. The second signal pathway can receive an input data signal from the USB compliant sink device in accordance with the version of the USB standard. The logical state machine can power down the re-driver circuit in response to detecting an electrical cable coupled between a USB compliant source device including the re-driver circuit and the USB compliant sink device becoming disconnected.

In these embodiments, the version of the USB standard can include USB 3.x.

In these embodiments, the first signal pathway can include detection circuitry. The detection circuitry can measure a peak voltage swing of the output data signal, and provide a disconnection detect signal at a first logical level to indicate that the USB compliant source device is connected to the USB compliant sink device when the output data signal is at a first value or provide the disconnection detect signal at a second logical level to indicate that the USB compliant source device is disconnected from the USB compliant sink device when the output data signal is at a second value that is greater than the first value. In these embodiments, the logical state machine can cause the re-driver circuit to enter into or maintain an active link state in response to the disconnection detect signal being at the first logical level or to power down the re-driver circuit in response to the disconnection detect signal being at the second logical level. In these embodiments, the active link state can include a link state U0 of the version of the Universal Serial Bus (USB) standard. In these embodiments, the logical state machine can cause the USB compliant source device to enter into a power-down mode of operation to power down the re-driver circuit in response to the disconnection detect signal being at the second logical level.

In these embodiments, the logical state machine can power down one or more components of the re-driver circuit in response to detecting the electrical cable has become disconnected.

In these embodiments, the logical first signal pathway can include a first receiving bias circuit, a first equalizer, a first line driver, and a first transmitting bias circuit and the second signal pathway can include a second receiving bias circuit, a second equalizer, a second line driver, and a second transmitting bias circuit.

Some embodiments of this disclosure describe a method for operating a Universal Serial Bus (USB) compliant source device. The method includes: providing an output data signal for transmission to a USB compliant sink device communicatively coupled to the USB compliant source device, measuring a peak voltage swing of the output data signal, providing a disconnection detect signal at a first logical level to detect that the USB compliant source device is connected to the USB compliant sink device when the peak voltage swing of the output data signal is less than a programmable threshold or at a second logical level to detect that the compliant USB compliant source device is disconnected from the compliant USB compliant sink device when the peak voltage swing of the output data signal is greater than the programmable threshold, and powering down the USB compliant source device in response to detecting that the USB compliant source device is disconnected from the USB compliant sink device.

In these embodiments, the method can further include entering into or maintaining an active link state in response to detecting that the USB compliant source device is connected to the USB compliant sink device. In these embodiments, the active link state can include a link state U0 of a version of a Universal Serial Bus (USB) standard. In these embodiments, the version of the USB standard can include a version USB 3.x of the USB standard.

In these embodiments, the powering down can further include entering into a power-down mode of operation to power down the USB compliant source device in response to the detecting that the USB compliant source device is disconnected from the USB compliant sink device.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

Figure 1:
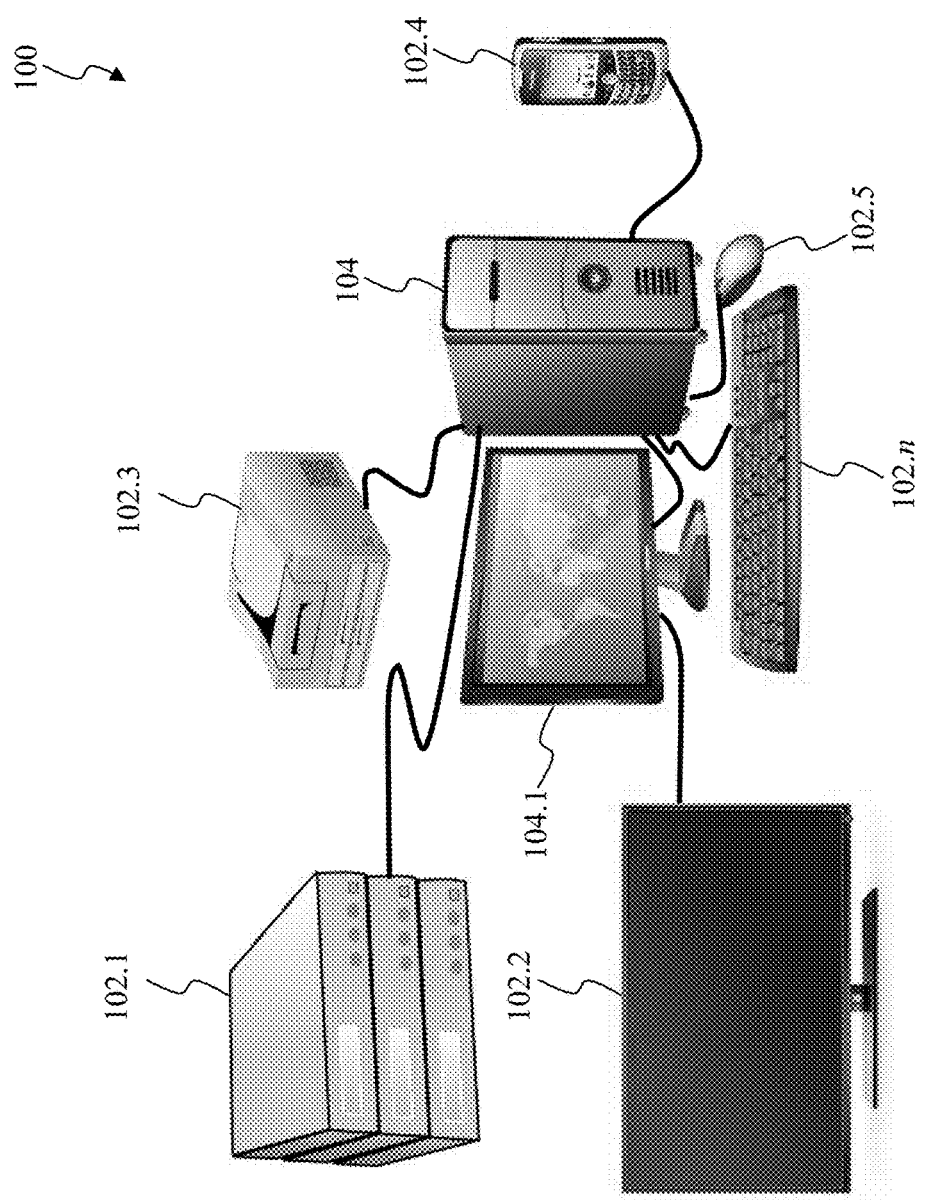
FIG. 1 graphically illustrates a simplified block diagram of an exemplary device environment in accordance with various embodiments of the present disclosure.

The disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

Systems, methods, and apparatuses disclosed herein can detect whether an electrical cable between a source device and a sink device has become disconnected, for example, pulled out by mistake, become frayed and break, or may simply fail. The source device and/or the sink device can be compliant with a version of a Universal Serial Bus (USB) standard, for example, USB 3.x. These systems, methods, and apparatuses can monitor peak voltage swings of data signals flowing between the source device and the sink device. The peak voltage swing of these data signals can be at a first value when the electrical cable is connected to the source device and the sink device or at a second value greater than the first value when the electrical cable is disconnected from the source device or the sink device. The peak voltage swing can switch from the first value to the second value in response to the electrical cable being disconnected from the source device or the sink device. As such, these systems, methods, and apparatuses can determine that the electrical cable has become disconnected from the source device or the sink device in response to detecting the second value for the peak voltage swing of the data signals flowing from the source device to the sink device.

Exemplary Device Environment

FIG. 1 graphically illustrates a simplified block diagram of an exemplary device environment in accordance with various embodiments of the present disclosure. In the exemplary embodiment illustrated in FIG. 1, a device environment 100 includes multiple mechanical, electrical, or electromechanical devices that communicate amongst one another. As illustrated in FIG. 1, the multiple mechanical, electrical, or electromechanical devices can include one or more sink devices, such as one or more peripheral electronic devices 102.1 through 102.n, and a source device, such as a personal computing device 104, that is communicatively coupled to the one or more sink devices. The one or more peripheral electronic devices 102.1 through 102.n can include a server 102.1, a television 102.2, a printer 102.3, a mobile computing device 102.4, a computer mouse 102.5, a keyboard 102.n and/or any other suitable mechanical, electrical, or electromechanical device that can be communicatively coupled to the personal computing device 104 as will be apparent to those skilled in the relevant art(s) without departing from the spirit and scope of the present disclosure. These other suitable mechanical, electrical, or electromechanical devices can include input devices that provide information to the personal computing device 104, output devices that provide information from the personal computing device 104, and/or input/output devices to provide some examples. Although the source device is described as including the personal computing device 104 in FIG. 1, those skilled in the relevant art(s) will recognize that the source device can include any suitable mechanical, electrical, or electromechanical device that is capable of managing communication with the one or more sink devices without departing from the spirit and scope of the present disclosure.

As to be described in further detail below, the mechanical, electrical, or electromechanical devices within the device environment 100 communicate amongst one another using a wireline standard, such as a version of a Universal Serial Bus (USB) standard, for example, USB 3.x; a version of an Institute of Electrical and Electronics Engineers (IEEE) 1394 standard, also referred to as FireWire; a version of an Ethernet standard, a version of a Displayport standard, a version of a Music Instrument Digital Interface (MIDI) standard; a version of a eSATA/eSATAp standard; and/or a version of a Thunderbolt standard to provide some examples. As illustrated in FIG. 1, these mechanical, electrical, or electromechanical devices can be communicatively coupled to one another using one or more electrical cables, such as one or more coaxial cables, flexible cables, heliax cables, non-metallic sheathed cables, metallic sheathed cables, multicore cables, paired cables, ribbon cables, shielded cables, single cables, twinaxial cables, twin-lead cables, twisted pair cables, and/or any other suitable configuration of electrical conductors that is suitable for carrying electric signals that will be apparent to those skilled in the relevant art(s) without departing from the spirit and scope of the present disclosure. In some embodiments, some of these electrical cables can become disconnected, for example, unplugged, from their corresponding mechanical, electrical, or electromechanical devices. As to be described in further detail below, the mechanical, electrical, or electromechanical devices within the device environment 100 can include disconnect detection circuitry to detect whether the multiple electrical cables between these devices have become disconnected. Alternatively, or in addition to, some of these electrical cables can include disconnect detection circuitry to detect whether the multiple electrical cables between these devices have become disconnected. In some embodiments, the disconnect detection circuitry can detect whether the multiple electrical cables have become disconnected as these devices are in an active state, for example, actively communicating with each other. In these embodiments, the disconnect detection circuitry can cause these devices to cease communicating with each other and to transition into, for example, a power-down mode of operation, upon detection of the electrical cables between these devices being disconnected.

Figure 2A:
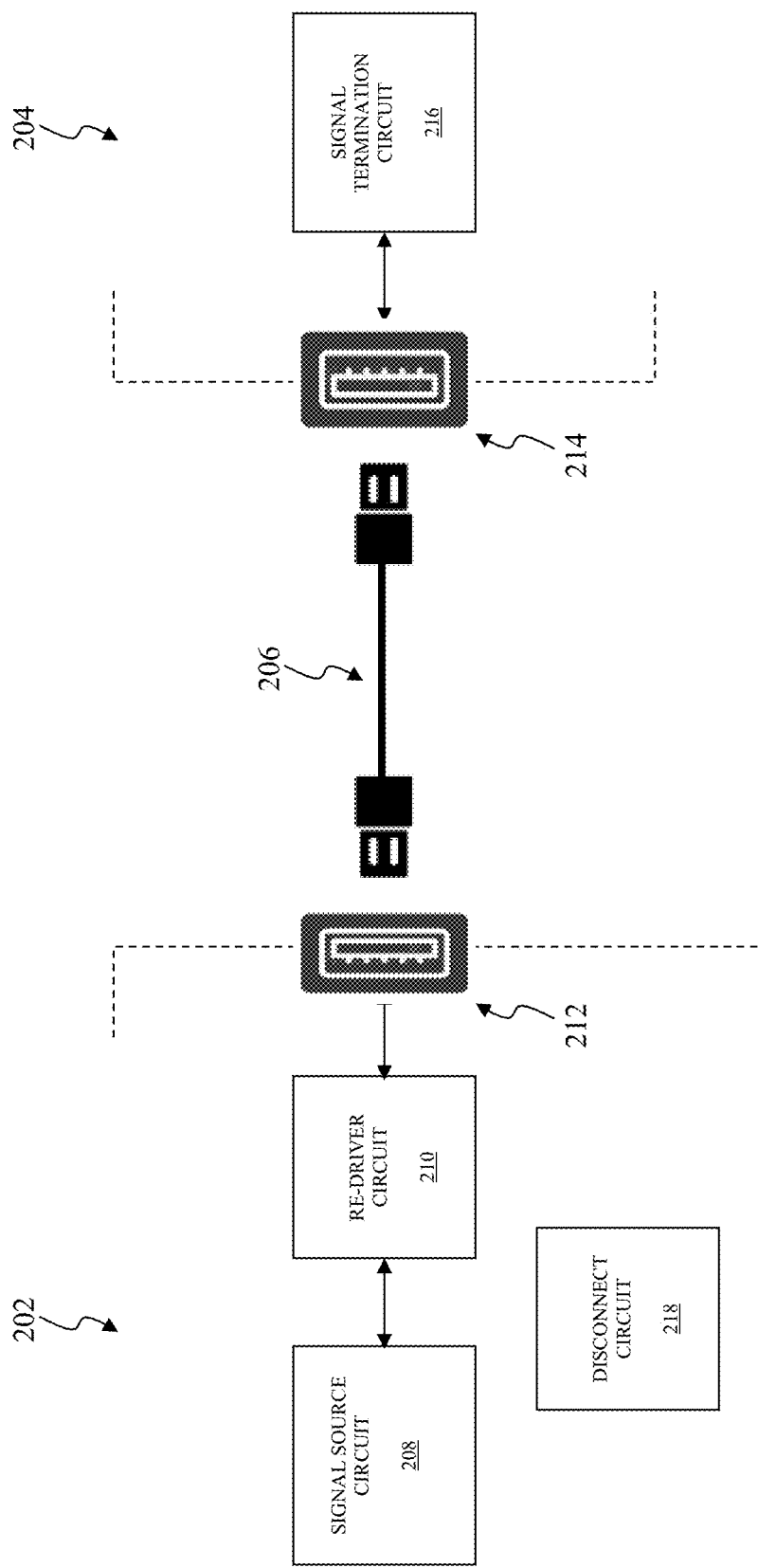
FIG. 2A through FIG. 2C graphically illustrate exemplary block diagrams of exemplary source and sink devices that can be implemented within the exemplary device environment in accordance with various embodiments of the present disclosure.
Figure 2B:
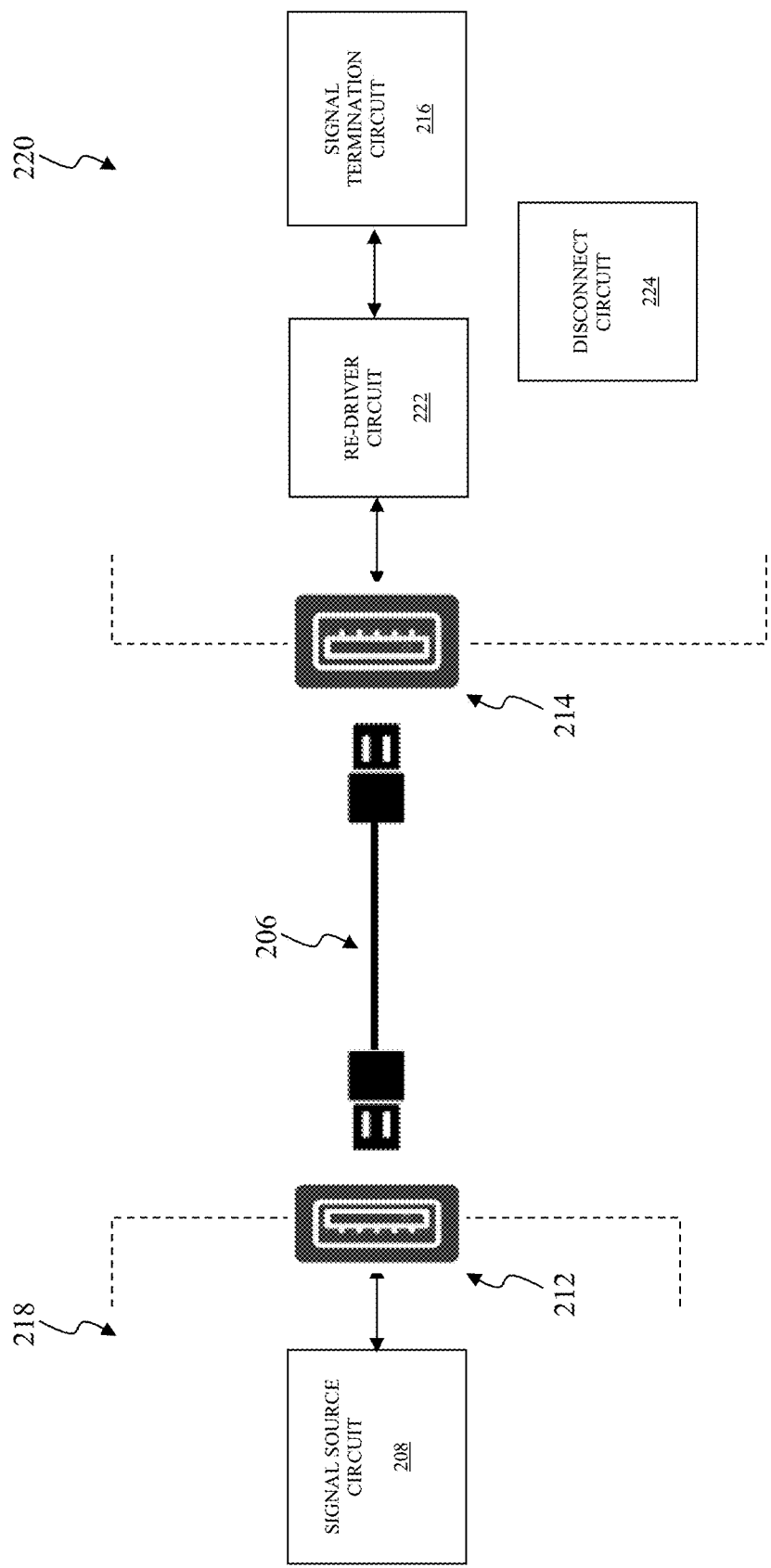
Figure 2C:
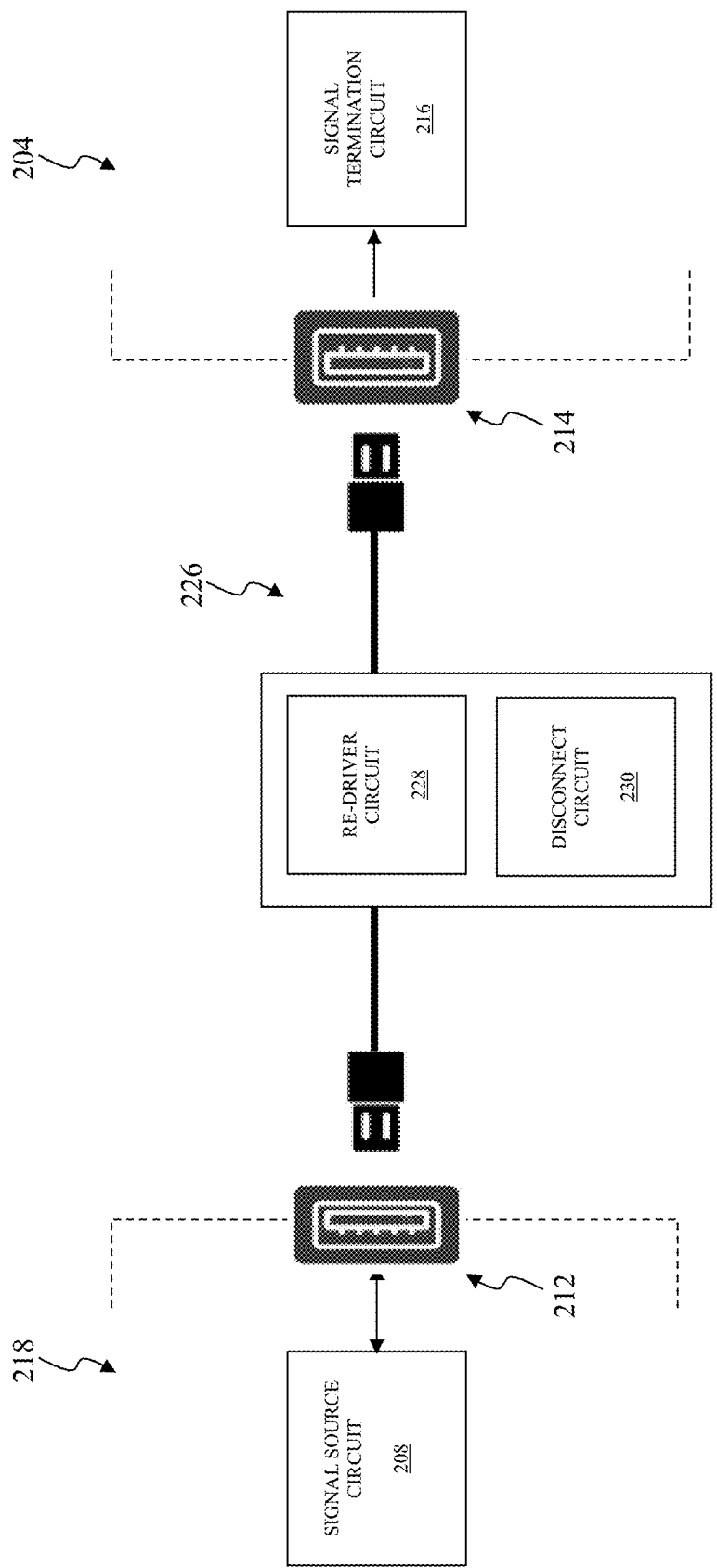

Exemplary Source and Sink Devices that can Implemented within the Exemplary Device Environment FIG. 2A through FIG. 2C graphically illustrate exemplary block diagrams of exemplary source and sink devices that can be implemented within the exemplary device environment in accordance with various embodiments of the present disclosure. In the exemplary embodiments illustrated in FIG. 2A through FIG. 2C, USB compliant source devices can communicate with USB compliant sink devices using a version of a Universal Serial Bus (USB) standard, for example, USB 3.x wireline standard. The "Universal Serial Bus Revision Bus 3.2 Specification," the "Universal Serial Bus Revision 3.1 Specification," and the Universal Serial Bus Revision 3.0 Specification" are incorporated herein by reference in their entirety. As illustrated in FIG. 2A through FIG. 2C, these USB compliant source device and USB compliant sink devices can be communicatively coupled to one another using a USB compliant data cable 206, such as one or more coaxial cables, flexible cables, heliax cables, non-metallic sheathed cables, metallic sheathed cables, multicore cables, paired cables, ribbon cables, shielded cables, single cables, twinaxial cables, twin-lead cables, twisted pair cables, and/or any other suitable configuration of electrical conductors that is suitable for carrying electric signals that will be apparent to those skilled in the relevant art(s) without departing from the spirit and scope of the present disclosure. In some embodiments, these USB compliant data cables can be implemented as active cables, such as the USB compliant data cables 226 as to be described in further detail below in FIG. 2C, including one or more re-drivers and/or optical to electrical converters to provide some examples. In some embodiments, these USB compliant data cables can become disconnected, for example, unplugged, from these USB compliant source devices or these USB compliant sink devices. As to be described in further detail below in FIG. 2A through FIG. 2C, these USB compliant source devices, these USB compliant sink devices, and/or these USB compliant data cables can include disconnect detection circuitry to detect whether these USB compliant data cables have become disconnected. In some embodiments, the disconnect detection circuitry can detect whether these USB compliant data cables have become disconnected as these USB compliant source devices are in an active state, for example, actively communicating with these USB compliant sink devices. In these embodiments, the disconnect detection circuitry can cause these USB compliant source devices to cease communicating with these USB compliant sink devices and to transition into, for example, a power-down mode of operation, upon detection of these USB compliant data cables being disconnected.

In the exemplary embodiment illustrated in FIG. 2A, a USB compliant source device 202 can include signal source circuit 208, a re-driver circuit 210, a connector 212, and a disconnect circuit 218 and a USB compliant sink device 204 can include a connector 214 and signal termination circuit 216. The USB compliant source device 202 can represent an exemplary embodiment of the source device as described above in FIG. 1 and/or the USB compliant sink device 204 can represent an exemplary embodiment of the sink device as described above in FIG. 1. The USB compliant source device 202 manages USB transactions between the USB compliant source device 202 and the USB compliant sink device 204 as outlined in the version of the Universal Serial Bus (USB) standard. The USB standard outlines various specifications for cables, connectors, and protocols for connection, communication, and power supply between these mechanical, electrical, or electromechanical devices. As illustrated in FIG. 2A, the signal source circuit 208 performs the functions of a USB host and/or host controller as outlined in the version of the Universal Serial Bus (USB) standard. These functions can include, but not limited to, detecting the insertion and removal of USB devices, managing the control and data flow between USB devices, and/or providing power to USB devices to provide some examples. As illustrated in FIG. 2A, the signal source circuit 208 can provide input data signals to the re-driver circuit 210 for transmitting to the USB compliant sink device 204 and/or can receive output data signals from the re-driver circuit 210 that are received from the USB compliant sink device 204. In some embodiments, the signal source circuit 208 can include one or more re-timer circuits to extract a clocking signal from the output data signals from the re-driver circuit 210 and to re-time the output data signals from the re-driver circuit 210 using the clocking signal to regenerate these output data signals. In some embodiments, the signal source circuit 208 can include one or more circuits, one or more processors, or any combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

The re-driver circuit 210 improves the quality of data signals flowing between the USB compliant source device 202 and the USB compliant sink device 204. In some embodiments, various intra-board and inter-board losses within the USB compliant source device 202, the USB compliant sink device 204, and/or the USB compliant data cable 206, such as insertion loss, crosstalk, inter-symbol interference, signal reflections, jitter, and/or noise to provide some examples, can cause the data signals flowing between these devices to degrade. In these embodiments, the USB compliant source device 202, the USB compliant sink device 204, and/or the USB compliant data cable 206 can include signal traces, connectors and cables which can also degrade the data signals flowing between the USB compliant source device 202 and the USB compliant sink device 204. In some situations, the degradation of the data signals flowing between the USB compliant source device 202 and the USB compliant sink device 204 can cause these data signals to no longer be compliant with the version of the USB standard. In these embodiments, this degradation of the data signals can cause interoperability issues between the USB compliant source device 202 and the USB compliant sink device 204. For example, the USB standard outlines certain loss budgets for electrical compliance, such as a maximum of 20 dB loss between the USB compliant source device 202, the USB compliant sink device 204, and/or the USB compliant data cable 206 for USB 3.1 Gen 1 and a maximum of 23 dB loss between the USB compliant source device 202, the USB compliant sink device 204, and/or the USB compliant data cable 206 for USB 3.1 Gen 2.

In the exemplary embodiment illustrated in FIG. 2A, the re-driver circuit 210 can condition, for example, equalize and/or amplify, the data signals flowing between the USB compliant source device 202 and the USB compliant sink device 204 to compensate for this degradation. In some embodiments, the re-driver circuit 210 can condition the data signals flowing between the USB compliant source device 202 and the USB compliant sink device 204 to compensate for the losses impressed onto these data signals by the USB compliant source device 202, the USB compliant sink device 204, and/or the USB compliant data cable 206. In these embodiments, the re-driver circuit 210 can condition these data signals to remain compliant with the version of the USB standard and/or to avoid interoperability issues between the USB compliant source device 202 and the USB compliant sink device 204. From the example above, the re-driver circuit 210 can equalize and/or amplify the data signals flowing between the USB compliant source device 202 and the USB compliant sink device 204 such that the losses impressed onto these data signals by the USB compliant source device 202, the USB compliant sink device 204, and/or the USB compliant data cable 206 are less than the maximum of 20 dB for USB 3.1 Gen 1 or less than the maximum of 23 dB for USB 3.1 Gen 2.

In the exemplary embodiment illustrated in FIG. 2A, the re-driver circuit 210 can be coupled to the disconnect detection circuit 218 to detect whether the USB compliant data cable 206 has become disconnected. The disconnect detection circuit 218 can detect whether the USB compliant data cable 206 has become disconnected as the USB compliant source device 202 is an active state, for example, actively communicating with the USB compliant sink device 204. The disconnect detection circuit 218 actively monitors the data signals flowing from the USB compliant source device 202 to the USB compliant sink device 204. In some embodiments, the disconnect detection circuit 218 can include a peak detector, an envelope detector, a window detector, a comparator, and/or any other suitable mechanical, electrical, or electromechanical device that can monitor the data signals flowing from the USB compliant source device 202 to the USB compliant sink device 204 that will be apparent to those skilled in the relevant art(s) without departing from the spirit and scope of the present disclosure. In some embodiments, the peak voltage swing of these data signals can be at a first value when the USB compliant data cable 206 is connected to the USB compliant source device 202 and the USB compliant sink device 204 or at a second value greater than the first value when the USB compliant data cable 206 is disconnected from the USB compliant source device 202 or the USB compliant sink device 204. In some embodiments, the disconnect detection circuit 218 can detect the first value in response to a receiving, for example, a training pattern after completing polling as outlined in the version of the Universal Serial Bus (USB) standard. In these embodiments, the disconnect detection circuit 218 can thereafter set the second value. In these embodiments, the second value can be approximately twice the first value. In these embodiments, the peak voltage swing switches from the first value to the second value in response to the USB compliant data cable 206 being disconnected from the USB compliant source device 202 or the USB compliant sink device 204. As such, the disconnect detection circuit 218 can determine that the USB compliant data cable 206 has become disconnected from the USB compliant source device 202 or the USB compliant sink device 204 in response to detecting the second value for the peak voltage swing of the data signals flowing from the USB compliant source device 202 to the USB compliant sink device 204. The disconnect detection circuit 218 can cause the USB compliant source device 202 to cease communicating with the USB compliant sink device 204 and to transition into, for example, a power-down mode of operation, upon detecting the second value for the peak voltage swing of the data signals flowing from the USB compliant source device 202 to the USB compliant sink device 204, namely, detecting the USB compliant data cable 206 has become disconnected. In some embodiments, the re-driver circuit 210 can include termination resistors, for example, between approximately thirty-six (36) ohm (Ω) and approximately sixty (60) Ω, that can be sensed by the USB compliant sink device 204 to detect the presence of the USB compliant source device 202. In these embodiments, the disconnect detection circuit 218 can cause the re-driver circuit 210 to isolate these termination resistors to prevent the USB compliant sink device 204 from detecting the presence of the USB compliant source device 202 upon detecting the USB compliant data cable 206 has become disconnected.

The connector 212 electrically couples and/or mechanical connects the USB compliant source device 202 to the USB compliant data cable 206. In the exemplary embodiment illustrated in FIG. 2A, the connector 212 represents a female connector, or receptacle, that is mounted within the USB compliant source device 202 that connects to a male connector, or plug, that is attached to the USB compliant data cable 206. In some embodiments, the connector 212 can include one or more data pins for transferring of electrical data signals between the USB compliant source device 202 to the USB compliant sink device 204 and/or one or more power pins for transferring of electrical power between the USB compliant source device 202 to the USB compliant sink device 204. In some embodiments the connector 212 can be implemented as a Type A connector, a Type B connector, a Type C connector, a Mini-A connector, a Mini-B connector, a Mini-AB connector, a Micro-A connector, a Micro-B connector, and/or a Micro-AB connector to provide some examples.

The USB compliant sink device 204 responds to the USB transactions provided by the USB compliant source device 202. The connector 214 electrically couples and/or mechanical connects the USB compliant sink device 204 to the USB compliant data cable 206. In the exemplary embodiment illustrated in FIG. 2A, the connector 214 represents a female connector, or receptacle, that is mounted within the USB compliant sink device 204 that connects to a male connector, or plug, that is attached to the USB compliant data cable 206. In some embodiments, the connector 214 can include one or more data pins for transferring of electrical data signals between the USB compliant source device 202 to the USB compliant sink device 204 and/or one or more power pins for transferring of electrical power between the USB compliant source device 202 to the USB compliant sink device 204. In some embodiments the connector 214 can be implemented as a Type A connector, a Type B connector, a Type C connector, a Mini-A connector, a Mini-B connector, a Mini-AB connector, a Micro-A connector, a Micro-B connector, and/or a Micro-AB connector to provide some examples.

The signal termination circuit 216 represents a logical or physical entity that performs one or more functions. The signal termination circuit 216 can represent to a single hardware component, for example, a memory device. However, those skilled in the relevant art(s) will recognize that more complicated signal termination circuit 216 is possible, such as a collection of hardware components that perform a particular function, such as a USB interface device to provide an example, without departing from the spirit and scope of the present disclosure. As illustrated in FIG. 2A, the signal termination circuit 216 can provide input data signals to the USB compliant source device 202 and/or can receive output data signals from the USB compliant source device 202. In some embodiments, the signal termination circuit 216 can include one or more re-timer circuits to extract a clocking signal from the output data signals from the USB compliant source device 202 and to re-time the output data signals from the USB compliant source device 202 using the clocking signal to regenerate these output data signals. In some embodiments, the signal termination circuit 216 can include one or more circuits, one or more processors, or any combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

In the exemplary embodiment illustrated in FIG. 2B, a USB compliant source device 224 can the include signal source circuit 208 and the connector 212 and a USB compliant sink device 220 can include the connector 214, the signal termination circuit 216, a re-driver circuit 222, and a disconnect circuit 224. The USB compliant source device 224 can represent an exemplary embodiment of the source device as described above in FIG. 1 and/or the USB compliant sink device 220 can represent an exemplary embodiment of the sink device as described above in FIG. 1. The USB compliant source device 224 and the USB compliant sink device 220 as illustrated in FIG. 2B share many similar features as the USB compliant source device 202 and the USB compliant sink device 204, respectively, as described above in FIG. 2A. Therefore, only differences between these devices are to be described in further detail below.

The USB compliant source device 224 manages USB transactions between the USB compliant source device 224 and the USB compliant sink device 220 as outlined in the version of the Universal Serial Bus (USB) standard. As illustrated in FIG. 2B, the signal source circuit 208 performs the functions of a USB host and/or host controller as outlined in the version of the Universal Serial Bus (USB) standard in a substantially similar manner as described above in FIG. 2A. As illustrated in FIG. 2B, the signal source circuit 208 can provide input data signals to the USB compliant sink device 220 and/or can receive output data signals from the USB compliant sink device 220. In some embodiments, the signal source circuit 208 can include one or more re-timer circuits to extract a clocking signal from the output data signals from USB compliant sink device 220 and to re-time the output data signals from USB compliant sink device 220 using the clocking signal to regenerate these output data signals.

The USB compliant sink device 220 responds to the USB transactions provided by the USB compliant source device 224. The USB compliant sink device 220 responds to the USB transactions provided by the USB compliant source device 224. The signal termination circuit 216 represents a logical or physical entity that performs one or more functions in a substantially similar manner as described above in FIG. 2A. As illustrated in FIG. 2B, the signal termination circuit 216 can provide input data signals to the re-driver circuit 222 for transmitting to the USB compliant source device 224 and/or can receive output data signals from the re-driver circuit 222 that are received from the USB compliant source device 224. In some embodiments, the signal termination circuit 216 can include one or more re-timer circuits to extract a clocking signal from the output data signals from the re-driver circuit 222 and to re-time the output data signals from the re-driver circuit 222 using the clocking signal to regenerate these output data signals. In some embodiments, the signal termination circuit 216 can include one or more circuits, one or more processors, or any combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

The re-driver circuit 222 improves the quality of data signals flowing between the USB compliant source device 224 and the USB compliant sink device 220. In the exemplary embodiment illustrated in FIG. 2B, the re-driver circuit 222 can condition, for example, equalize and/or amplify, the data signals flowing between the USB compliant source device 224 and the USB compliant sink device 220 to compensate for their degradation. In some embodiments, the re-driver circuit 222 can condition the data signals flowing between the USB compliant source device 224 and the USB compliant sink device 220 to compensate for the losses impressed onto these data signals by the USB compliant source device 224, the USB compliant sink device 220, and/or the USB compliant data cable 206. In these embodiments, the re-driver circuit 222 can condition these data signals to remain compliant with the version of the USB standard and/or to avoid interoperability issues between the USB compliant source device 224 and the USB compliant sink device 220.

In the exemplary embodiment illustrated in FIG. 2B, the re-driver circuit 222 can be coupled to the disconnect detection circuit 224 to detect whether the USB compliant data cable 206 has become disconnected in a substantially similar manner as described above in FIG. 2A. The disconnect detection circuit 224 actively monitors the data signals flowing from the USB compliant sink device 220 to the USB compliant source device 224. In some embodiments, the peak voltage swing of these data signals can be at a first value when the USB compliant data cable 206 is connected to the USB compliant source device 224 and the USB compliant sink device 220 or at a second value greater than the first value when the USB compliant data cable 206 is disconnected from the USB compliant source device 224 or the USB compliant sink device 220. In these embodiments, the peak voltage swing switches from the first value to the second value in response to the USB compliant data cable 206 being disconnected from the USB compliant source device 224 or the USB compliant sink device 220. As such, the disconnect detection circuit 224 can determine that the USB compliant data cable 206 has become disconnected from the USB compliant source device 224 or the USB compliant sink device 220 in response to detecting the second value for the peak voltage swing of the data signals flowing from the USB compliant source device 224 to the USB compliant sink device 220 in a substantially similar manner as described above in FIG. 2A. The disconnect detection circuit 224 can cause the USB compliant sink device 220 to cease communicating with the USB compliant source device 224 and to transition into, for example, a power-down mode of operation, upon detecting the second value for the peak voltage swing of the data signals flowing from the USB compliant sink device 220 to the USB compliant source device 224, namely, detecting the USB compliant data cable 206 has become disconnected. In some embodiments, the re-driver circuit 222 can include termination resistors, for example, between approximately thirty-six (36) ohm (Ω) and approximately sixty (60) Ω, that can be sensed by the USB compliant source device 224 to detect the presence of the USB compliant sink device 220. In these embodiments, the disconnect detection circuit 224 can cause the re-driver circuit 222 to isolate these small termination resistors to prevent the USB compliant source device 224 from detecting the presence of the USB compliant source device 220 upon detecting the USB compliant data cable 206 has become disconnected.

In the exemplary embodiment illustrated in FIG. 2C, a USB compliant data cable 226 can a re-driver circuit 228 and a disconnect circuit 230. As illustrated in FIG. 2C, the re-driver circuit 228 improves the quality of data signals flowing between the USB compliant source device 218 as described above in FIG. 2B and the USB compliant sink device 204 as described above in FIG. 2C. In the exemplary embodiment illustrated in FIG. 2A, the re-driver circuit 228 can condition, for example, equalize and/or amplify, the data signals flowing between the USB compliant source device 218 and the USB compliant sink device 204 to compensate for their degradation. In some embodiments, the re-driver circuit 228 can condition the data signals flowing between the USB compliant source device 218 and the USB compliant sink device 204 to compensate for the losses impressed onto these data signals by the USB compliant source device 218, the USB compliant sink device 204, and/or the USB compliant data cable 226. In these embodiments, the re-driver circuit 228 can condition these data signals to remain compliant with the version of the USB standard and/or to avoid interoperability issues between the USB compliant source device 218 and the USB compliant sink device 204.

In the exemplary embodiment illustrated in FIG. 2C, the re-driver circuit 228 can be coupled to the disconnect detection circuit 230 to detect whether the USB compliant data cable 226 has become disconnected in a substantially similar manner as described above in FIG. 2A. The disconnect detection circuit 230 actively monitors the data signals flowing from the USB compliant sink device 204 to the USB compliant source device 218. In some embodiments, the peak voltage swing of these data signals can be at a first value when the USB compliant data cable 226 is connected to the USB compliant source device 218 and the USB compliant sink device 204 or at a second value greater than the first value when the USB compliant data cable 226 is disconnected from the USB compliant source device 218 or the USB compliant sink device 204. In these embodiments, the peak voltage swing switches from the first value to the second value in response to the USB compliant data cable 226 being disconnected from the USB compliant source device 218 or the USB compliant sink device 204. As such, the disconnect detection circuit 230 can determine that the USB compliant data cable 226 has become disconnected from the USB compliant source device 218 or the USB compliant sink device 204 in response to detecting the second value for the peak voltage swing of the data signals flowing from the USB compliant source device 218 to the USB compliant sink device 204 in a substantially similar manner as described above in FIG. 2A. The disconnect detection circuit 230 can cause the USB compliant sink device 204 to cease communicating with the USB compliant source device 218 and to transition into, for example, a power-down mode of operation, upon detecting the second value for the peak voltage swing of the data signals flowing from the USB compliant sink device 204 to the USB compliant source device 218, namely, detecting the USB compliant data cable 226 has become disconnected. In some embodiments, the re-driver circuit 228 can include termination resistors, for example, between approximately thirty-six (36) ohm (Ω) and approximately sixty (60) Ω, that can be sensed by the USB compliant source device 218 to detect the presence of the USB compliant sink device 204. In these embodiments, the disconnect detection circuit 230 can cause the re-driver circuit 228 to isolate these small termination resistors to prevent the USB compliant source device 218 from detecting the presence of the USB compliant source device 202 upon detecting the USB compliant data cable 226 has become disconnected.

Exemplary Operation of the Exemplary Source and Sink Devices

Figure 3B:
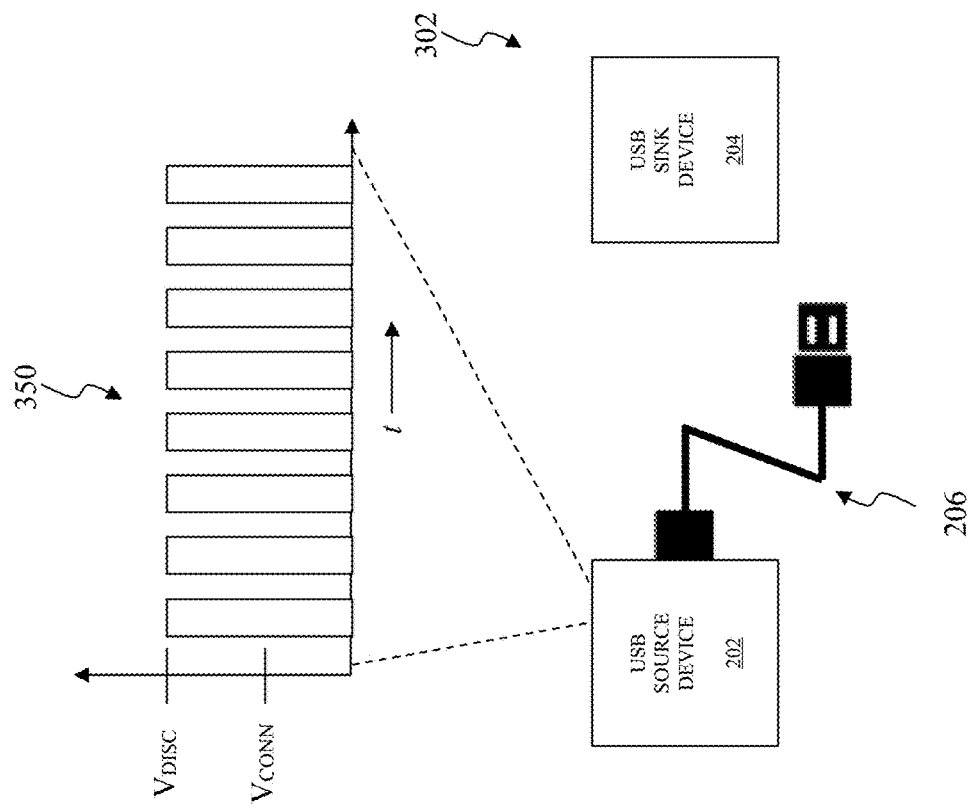
FIG. 3A and FIG. 3B graphically illustrate exemplary operations of the exemplary source and sink devices in accordance with various embodiments of the present disclosure.
Figure 3A:
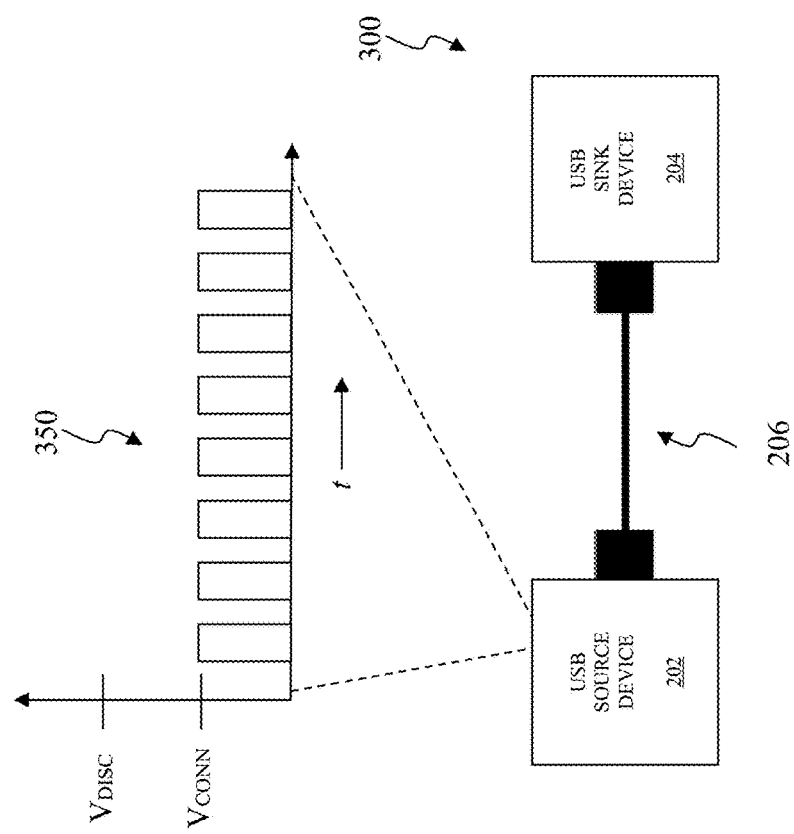

FIG. 3A and FIG. 3B graphically illustrate exemplary operations of the exemplary source and sink devices in accordance with various embodiments of the present disclosure. As described above in FIG. 2A, the USB compliant source device 202 can detect whether the USB compliant data cable 206 has become disconnected from the USB compliant source device 202 and/or the USB compliant sink device 204. In the exemplary embodiments illustrated in FIG. 3A and FIG. 3B, the USB compliant source device 202 can actively monitor data signals 350 flowing from the USB compliant source device 202 to the USB compliant sink device 204. Those skilled in the relevant art(s) will recognize that the illustration of the data signals 350 in FIG. 3A and FIG. 3B is for illustrative purposes only. Other waveforms are possible for the monitor data signals 350 without departing from the spirit and scope of the present disclosure. As illustrated in FIG. 3A, the USB compliant data cable 206 is connected to the USB compliant source device 202 and the USB compliant sink device 204 in a connected state 300. In the connected state 300, the peak voltage swing of the data signals 350 is at a connected voltage $V_{CONN}$. In some embodiments, the USB compliant source device 202 can determine that the USB compliant data cable 206 is in the connected state 300 in response to detecting the peak voltage swing of the data signals 350 is at the connected voltage $V_{CONN}$.

As illustrated in FIG. 3B, the USB compliant data cable 206 is disconnected from the USB compliant source device 202 or the USB compliant sink device 204 in a disconnected state 302. In some embodiments, the peak voltage swing of the data signals 350 switches from a connected voltage $V_{CONN}$ to a disconnected voltage $V_{DISC}$ in response to the USB compliant data cable 206 being disconnected. In these embodiments, the disconnected voltage $V_{DISC}$ can be approximately twice the connected voltage $V_{CONN}$. In these embodiments, the attenuation, for example, loading, of the data signals 350 from the USB compliant sink device 204 is effectively diminished when the USB compliant data cable 206 is disconnected which causes the peak voltage swing of the data signals 350 to increase from the connected voltage $V_{CONN}$ to a disconnected voltage $V_{DISC}$. In some embodiments, the disconnected voltage $V_{DISC}$ can be, for example, approximately twice the connected voltage $V_{CONN}$. In some embodiments, the USB compliant source device 202 can determine that the USB compliant data cable 206 is in the disconnected state 302 in response to detecting the peak voltage swing of the data signals 350 is at the disconnected voltage $V_{DISC}$.

Those skilled in the relevant art(s) will recognize that the USB compliant sink device 220 can operate in a substantially similar manner as described above in FIG. 3A and FIG. 3B to detect whether the USB compliant data cable 206 has become disconnected from the USB compliant source device 218 and/or the USB compliant sink device 220 as described above in FIG. 2B without departing from the spirit and scope of the present disclosure. And those skilled in the relevant art(s) will recognize that the USB compliant data cable 226 can operate in a substantially similar manner as described above in FIG. 3A and FIG. 3B to detect whether the USB compliant data cable 226 has become disconnected from the USB compliant source device 218 and/or the USB compliant sink device 204 as described above in FIG. 2C.

Figure 4:
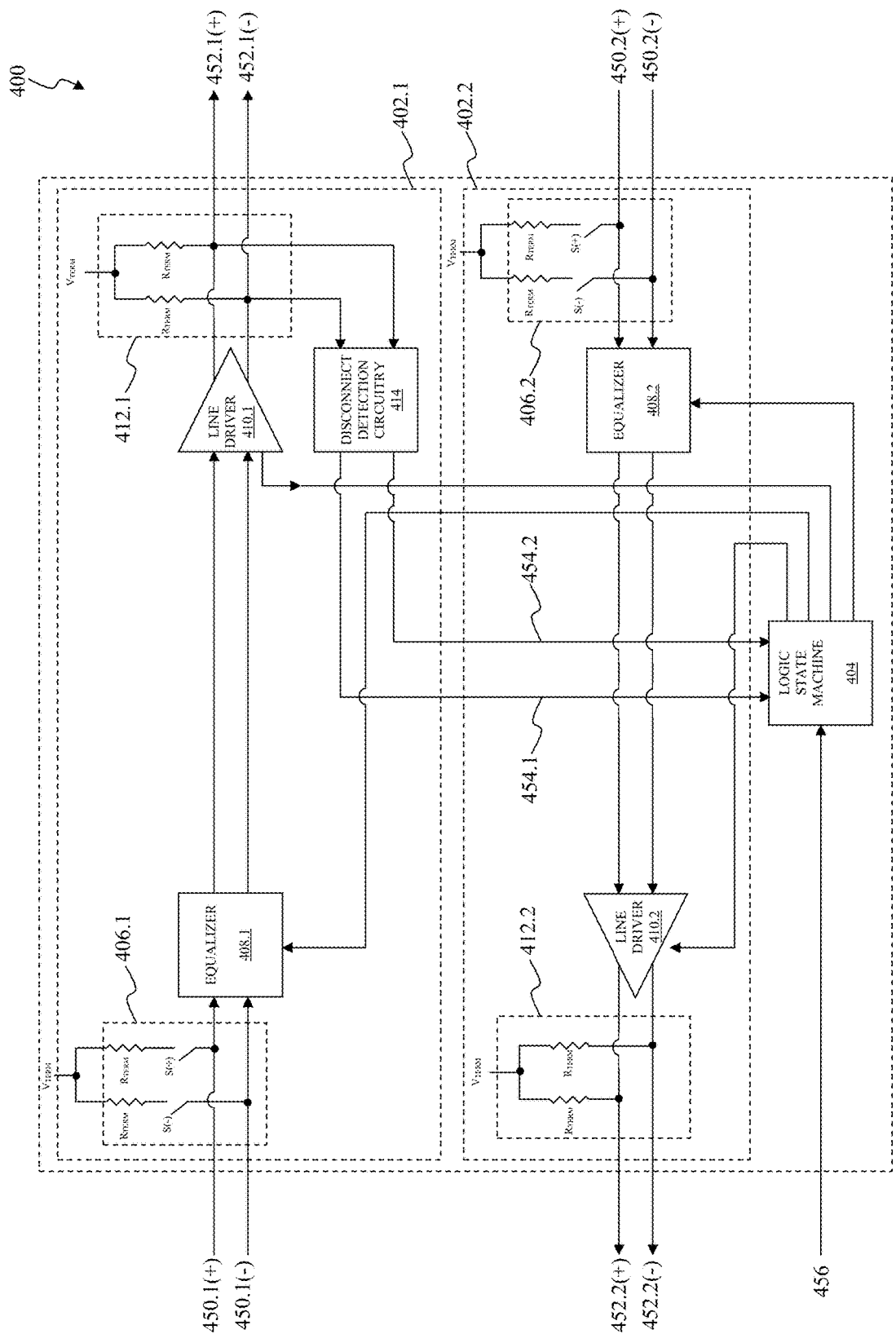
FIG. 4 graphically illustrates a simplified block diagram of exemplary re-driver circuit that can be implemented within the exemplary device environment in accordance with various embodiments of the present disclosure.

Exemplary Re-Driver Circuit that can Implemented within the Exemplary Device Environment FIG. 4 graphically illustrates a simplified block diagram of exemplary re-driver circuit that can be implemented within the exemplary device environment in accordance with various embodiments of the present disclosure. A re-driver circuit 400 can improve the quality of data signals flowing between a USB compliant source device and a USB compliant sink device, such as the USB compliant source device 202 and the USB compliant sink device 204 as described above in FIG. 2A, the USB compliant source device 218 and the USB compliant sink device 220 as described above in FIG. 2B, and/or the USB compliant source device 218 and the USB compliant sink device 204 as described above in FIG. 2C to provide some examples.

The re-driver circuit 400 can condition, for example, equalize and/or amplify, the data signals flowing between these USB devices to compensate for degradation in these data signals resulting from the losses impressed onto these data signals as described above. As to be described in further detail below, the re-driver circuit 400 can include the disconnect detection circuitry as described above to detect whether a data cable electrically coupling and/or mechanical connecting these USB devices to each other has become disconnected. The disconnect detection circuitry can detect whether the data cable has become disconnected as the USB compliant source device is an active state, for example, actively communicating with the USB compliant sink device. As illustrated in FIG. 4, the re-driver circuit 400 includes a transmission signal pathway 402.1, a reception signal pathway 402.2, and a logical state machine (LSM) 404. The re-driver circuit 400 can represent an exemplary embodiment of the re-driver circuit 210 as described above in FIG. 2A, the re-driver circuit 222 as described above in FIG. 2B, and/or the re-driver circuit 228 as described above in FIG. 2C.

The transmission signal pathway 402.1 represents a signal pathway for transmitting data signals in accordance with a version of a USB standard, for example, USB 3.x. As to be described in further detail below, the transmission signal pathway 402.1 can condition, for example, equalize and/or amplify, a differential input data signal 450.1(+) and 450.1(−), referred to as input data signal 450.1 for convenience, to provide a differential output data signal 452.1(+) and 452.1(−), referred to as output data signal 452.1 for convenience, for transmitting. As illustrated in FIG. 4, the transmission signal pathway 402.1 includes a receiving bias circuit 406.1, an equalizer 408.1, a line driver 410.1, a transmitting bias circuit 412.1, and disconnect detection circuitry 414. The receiving bias circuit 406.1 and the transmitting bias circuit 412.1 bias the input data signal 450.1 and the output data signal 452.1, respectively, in accordance with the version of the USB standard. As illustrated in FIG. 4, the receiving bias circuit 406.1 and the transmitting bias circuit 412.1 include termination resistors, denoted $R_{TERM}$ in FIG. 4, which are described in the version of the USB standard. In some embodiments, the termination resistors represent passive components in the receiving bias circuit 406.1 and the transmitting bias circuit 412.1 that prevent the input data signal 450.1 and/or the output data signal 452.1 from being reflected and/or echoed. In some embodiments, the receiving bias circuit 406.1 can further include switches S(−) and S(+) coupled between the termination resistors and the input data signal 450.1. In these embodiments, the switches S(−) and S(+) can be opened to decouple the termination resistors and the input data signal 450.1 upon detecting the data cable has become disconnected as to be described in further detail below. The equalizer 408.1 provides a frequency dependent pre-compensation on the input data signal 450.1 for distortion to be impressed onto the output data signal 452.1 by the data cable as the output data signal 452.1 is flowing from the USB compliant source device to the USB compliant sink device. The line driver 410.1 includes one or more signal amplifiers that amplify the data signal provided by the equalizer 408.1 to provide the output data signal 452.1 for transmission to the USB compliant sink device. In some embodiments, the line driver 410.1 can be characterized as having a source impedance as described in the version of the USB standard. The receiving bias circuit 406.1, the equalizer 408.1, the line driver 410.1, and/or the transmitting bias circuit 412.1 are further described in the version of the USB standard.

The disconnect detection circuitry 414 as described above can detect whether the data cable has become disconnected. The disconnect detection circuitry 414 can detect whether the data cable has become disconnected as the USB compliant source device is an active state, for example, actively communicating with the USB compliant sink device. The disconnect detection circuitry 414 actively monitors the output data signal 452.1. In some embodiments, the disconnect detection circuitry 414 can include a peak detector, an envelope detector, a window detector, a comparator, and/or any other suitable mechanical, electrical, or electromechanical device that can monitor the output data signal 452.1 that will be apparent to those skilled in the relevant art(s) without departing from the spirit and scope of the present disclosure. In some embodiments, the peak voltage swing of the output data signal 452.1 can be at a first value when the data cable is connected to the USB compliant source device and the USB compliant sink device or at a second value greater than the first value when the data cable is disconnected from the USB compliant source device or the USB compliant sink device. In these embodiments, the second value can be approximately twice the first value. In these embodiments, the peak voltage swing switches from the first value to the second value in response to the data cable being disconnected from the USB compliant source device or the USB compliant sink device. As such, the disconnect detection circuitry 414 can determine that the data cable has become disconnected from the USB compliant source device or the USB compliant sink device in response to detecting the second value for the peak voltage swing of the output data signal 452.1. In the exemplary embodiment illustrated in FIG. 4, the disconnect detection circuitry 414 can provide a first disconnection detect signal 454.1 at a first logical level, for example, logical zero, to indicate that the USB compliant source device is connected to the USB compliant sink device when the output data signal 452.1 is at the first value or at a second logical level, for example, logical one, to indicate that the USB compliant source device is disconnected from the USB compliant sink device when the output data signal 452.1 is at the second value. Similarly, the disconnect detection circuitry 414 can provide a second disconnection detect signal 454.2 at the first logical level to indicate that the USB compliant source device is connected to the USB compliant sink device when the output data signal 452.2 is at the first value or at the second logical level to indicate that the USB compliant source device is disconnected from the USB compliant sink device when the output data signal 452.2 is at the second value. An exemplary embodiment of the disconnect detection circuitry 414 is further described in FIG. 5.

The reception signal pathway 402.2 represents a signal pathway for receiving data signals from the USB compliant sink device in accordance with the version of the USB standard. As to be described in further detail below, the reception signal pathway 402.2 can condition, for example, equalize and/or amplify, a differential input data signal 450.2(+) and 450.2(−), referred to as input data signal 450.2 for convenience, that is received from the USB compliant sink device to provide a differential output data signal 452.2(+) and 452.2(−), referred to as output data signal 452.2 for convenience. As illustrated in FIG. 4, the reception signal pathway 402.2 includes a receiving bias circuit 406.2, an equalizer 408.2, a line driver 410.2, and transmitting bias circuit 412.2. The receiving bias circuit 406.2 and the transmitting bias circuit 412.2 bias the input data signal 450.2 and the output data signal 452.2, respectively, in accordance with the version of the USB standard. As illustrated in FIG. 4, the receiving bias circuit 406.2 and the transmitting bias circuit 412.2 include termination resistors, denoted $R_{TERM}$ in FIG. 4, which are described in the version of the USB standard. In some embodiments, the termination resistors represent passive components in the receiving bias circuit 406.2 and the transmitting bias circuit 412.2 that prevent the input data signal 450.2 and/or the output data signal 452.2 from being reflected and/or echoed. In some embodiments, the receiving bias circuit 406.2 can further include the switches S(−) and S(+) coupled between the termination resistors and the input data signal 450.1. In these embodiments, the switches S(−) and S(+) can be opened to decouple the termination resistors and the input data signal 450.1 upon detecting the data cable has become disconnected as to be described in further detail below. The equalizer 408.2 provides a frequency dependent compensation on the input data signal 450.2 received from the sink device for distortion impressed onto the output data signal 452.2 by the data cable as the output data signal 452.2 is flowing from the USB compliant sink device to the USB compliant source device. The line driver 410.2 includes one or more signal amplifiers that amplify the data signal provided by the equalizer 408.2 to provide the output data signal 452.2. In some embodiments, the line driver 410.2 can be characterized as having a source impedance as described in the version of the USB standard. The receiving bias circuit 406.2, the equalizer 408.2, the line driver 410.2, and/or the transmitting bias circuit 412.2 are further described in the version of the USB standard.

The logical state machine (LSM) 404 controls the overall configuration and operation of the re-driver circuit 400 in response to the first disconnection detect signal 454.1, the second disconnection detect signal 454.2, and/or a control signal 456. In the exemplary embodiment illustrated in FIG. 4, the USB compliant source device and/or the USB compliant sink device are configurable to operate in a link state that is selected from among different link states, such as link states U0 through U3 as described by the USB 3.0 standard. In some embodiments, the link state U0 represents an active connection between the USB compliant source device and the USB compliant sink device while the link state U3 represents an inactive, or idle, connection between the USB compliant source device and the USB compliant sink device with the USB compliant source device being placed into a suspend mode of operation. In these embodiments, the USB compliant source device can progressively enter into, or maintain, the link state U1 and the link state U2 in response to amount of time that the connection between the USB compliant source device and the USB compliant sink device has been idle. In the exemplary embodiment illustrated in FIG. 4, the LSM 404 can include or be coupled to one or more link timers to handle various USB 3.0 related timings, some of which are described above. In some embodiments, the LSM 404 can decide whether the receiving bias circuits 406.1 and 406.2, the equalizers 408.1 and 408.2, the line drivers 410.1 and 410.2, the transmitting bias circuit 412.1 and 412.2 and/or the disconnect detection circuitry 414 can be powered down based upon the link state of the USB compliant source device.

As illustrated in FIG. 4, the LSM 404 can determine the link state of the USB compliant source device from the first disconnection detect signal 454.1, the second disconnection detect signal 454.2, and/or the control signal 456. The LSM 404 can cause the USB compliant source device to cease communicating with the USB compliant sink device and to transition into, for example, a power-down mode of operation, upon detecting the second value for the peak voltage swings of the output data signal 452.1 and the output data signal 452.2, respectively. In some embodiments, the LSM 404 can open the switches S(−) and S(+) of the receiving bias circuit 406.2 and/or the receiving bias circuit 406.2 upon detecting the second value for the peak voltage swings of the output data signal 452.1 and the output data signal 452.2, respectively. In some embodiments, the LSM 404 can include one or more disconnect timers that can operate in a substantially similar manner as the one or more link timers to handle various USB 3.0 related timings as described above. In these embodiments, the LSM 404 can cause the re-driver circuit 400 to enter into, or maintain, the link state U0 based upon one or more disconnect timers. For example, the LSM 404 can cause the re-driver circuit 400 to enter into, or maintain, the link state U0 in response to the first disconnection detect signal 454.1 and/or the second disconnection detect signal 454.2 being at the first value for the peak voltage swing of the output data signal 452.1 and the output data signal 452.2, respectively, indicating that the USB compliant source device is connected to the USB compliant sink device.

In some embodiments, the control signal 456 can be provided by one or more Loss of Signal (LOS) detectors (not shown in FIG. 4) and/or one or more Low Frequency Periodic Signaling (LFPS) detectors (not shown in FIG. 4). In these embodiments, the one or more LOS detectors can monitor the input data signals 450.1 and 450.2 for data signals. And based upon outputs of these LOS detectors, the LSM 404 causes the re-driver circuit 400 to enter into, or maintain, the link state U0 as described by the USB 3.0 standard. In these embodiments, the one or more LFPS detectors can monitor the input data signals 450.1 and 450.2 for an LFPS message that signals power management information. And based upon the LFPS message monitored at the input data signals 450.1 and 450.2, the LSM 404 causes the re-driver circuit 400 to enter into, or maintain, the link state U0 as described by the USB 3.0 standard.

Figure 5:
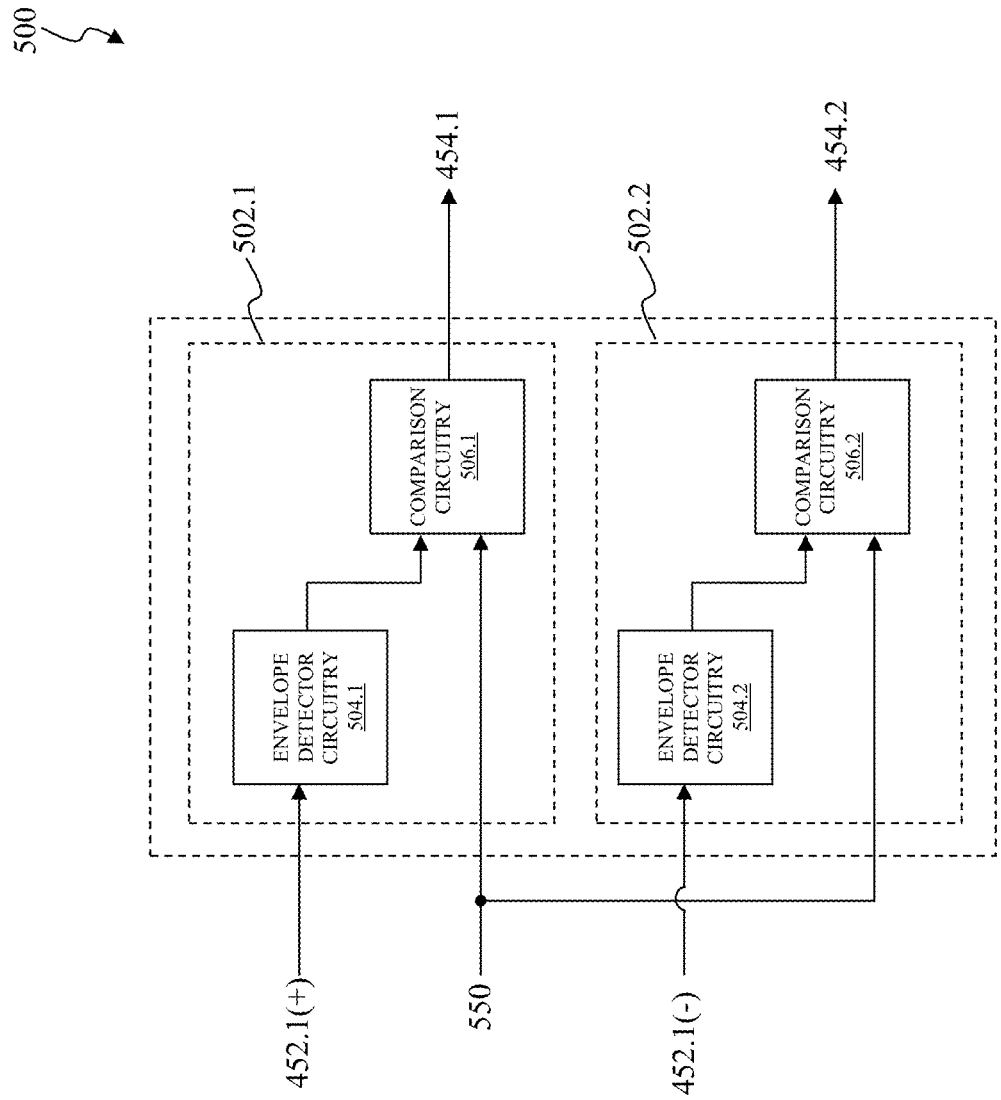
FIG. 5 graphically illustrates a simplified block diagram of exemplary disconnect detection circuitry that can be implemented within the re-driver circuit in accordance with various embodiments of the present disclosure.

Exemplary Disconnect Detection Circuitry that can Implemented within the Exemplary Re-Driver Circuit FIG. 5 graphically illustrates a simplified block diagram of exemplary disconnect detection circuitry that can be implemented within the re-driver circuit in accordance with various embodiments of the present disclosure. In the exemplary embodiment illustrated in FIG. 5, disconnect detection circuitry 500 can detect whether a data cable electrically coupling and/or mechanical connecting a USB compliant source device and a USB compliant sink device to each other has become disconnected. The disconnect detection circuitry 500 can detect whether the data cable has become disconnected as the USB compliant source device is an active state, for example, actively communicating with the USB compliant sink device. As illustrated in FIG. 5, the disconnect detection circuitry 500 includes a transmission disconnect detection circuitry 502.1 and a reception disconnect detection circuitry 502.2. The disconnect detection circuitry 500 can represent an exemplary embodiment of the disconnect detection circuitry 414 as described above in FIG. 4.

The transmission disconnect detection circuitry 502.1 monitors the output data signal 452.1(+) as described above in FIG. 4 to detect the peak voltage swing of the output data signal 452.1(+). And the reception disconnect detection circuitry 502.2 monitors the output data signal 452.1(−) as described above in FIG. 4 to detect the peak voltage swing of the output data signal 452.1(−). The transmission disconnect detection circuitry 502.1 includes envelope detector circuitry 504.1 and comparison circuitry 506.1 and the reception disconnect detection circuitry 502.2 includes envelope detector circuitry 504.2 and comparison circuitry 506.2. In the exemplary embodiment illustrated in FIG. 5, the envelope detector circuitry 504.2 and comparison circuitry 506.2 are substantially similar to the envelope detector circuitry 504.1 and comparison circuitry 506.1. Accordingly, only the envelope detector circuitry 504.1 and comparison circuitry 506.1 are to be discussed in further detail below.

The envelope detector circuitry 504.1 monitors the signal envelope of the output data signal 452.1(+) to estimate the peak voltage swing of the output data signal 452.1(+). In some embodiments, the envelope detector circuitry 504.1 can acquire the signal envelope of the output data signal 452.1(+) on the order of a few symbol times when initially receiving a signal on the output data signal 452.1(+) or when receiving a larger peak voltage swing than the current envelope detector value. As described above, the peak voltage swing of the output data signal 452.1(+) can be at a first value when the data cable is connected to the USB compliant source device and the USB compliant sink device or at a second value greater than the first value when the data cable is disconnected from the USB compliant source device or the USB compliant sink device. In some embodiments, the second value can be approximately twice the first value. In some embodiments, the envelope detector circuitry 504.1 can be implemented using a simple diode, resistor, and capacitor circuit; however more complicated circuits and even software executing on a digital signal processor (DSP) or a general purpose CPU are possible without departing from the spirit and scope of the present disclosure. In some embodiments, the envelope detector circuitry 504.1 can be characterized as having a significantly long filtering time, for example, greater than twelve (12) milliseconds (ms), to not falsely detect the data cable being disconnected. In some embodiments, the time constant of the envelope detector to transition to electrical idle levels can be set to be many times longer than the maximum run length of the high-speed data.

The comparison circuitry 506.1 compares the peak voltage swing of the output data signal 452.1(+) with a voltage swing disconnect threshold 550 to provide the first disconnection detect signal 454.1. The comparison circuitry 506.1 can provide the first disconnection detect signal 454.1 at a first logical level, for example, logical zero, to indicate that the USB compliant source device is connected to the USB compliant sink device when the peak voltage swing of the output data signal 452.1(+) is less than the voltage swing disconnect threshold 550 or at a second logical level, for example, logical one, to indicate that the USB compliant source device is disconnected from the USB compliant sink device when the output data signal 452.1(+) when the peak voltage swing of the output data signal 452.1(+) is greater than or equal to the voltage swing disconnect threshold 550. In some embodiments, the voltage swing disconnect threshold 550 can be a programmable threshold, for example, between the connected voltage $V_{CONN}$ and the disconnected voltage $V_{DISC}$.

Exemplary Operation of the Exemplary Disconnect Detection Circuitry

Figure 6:
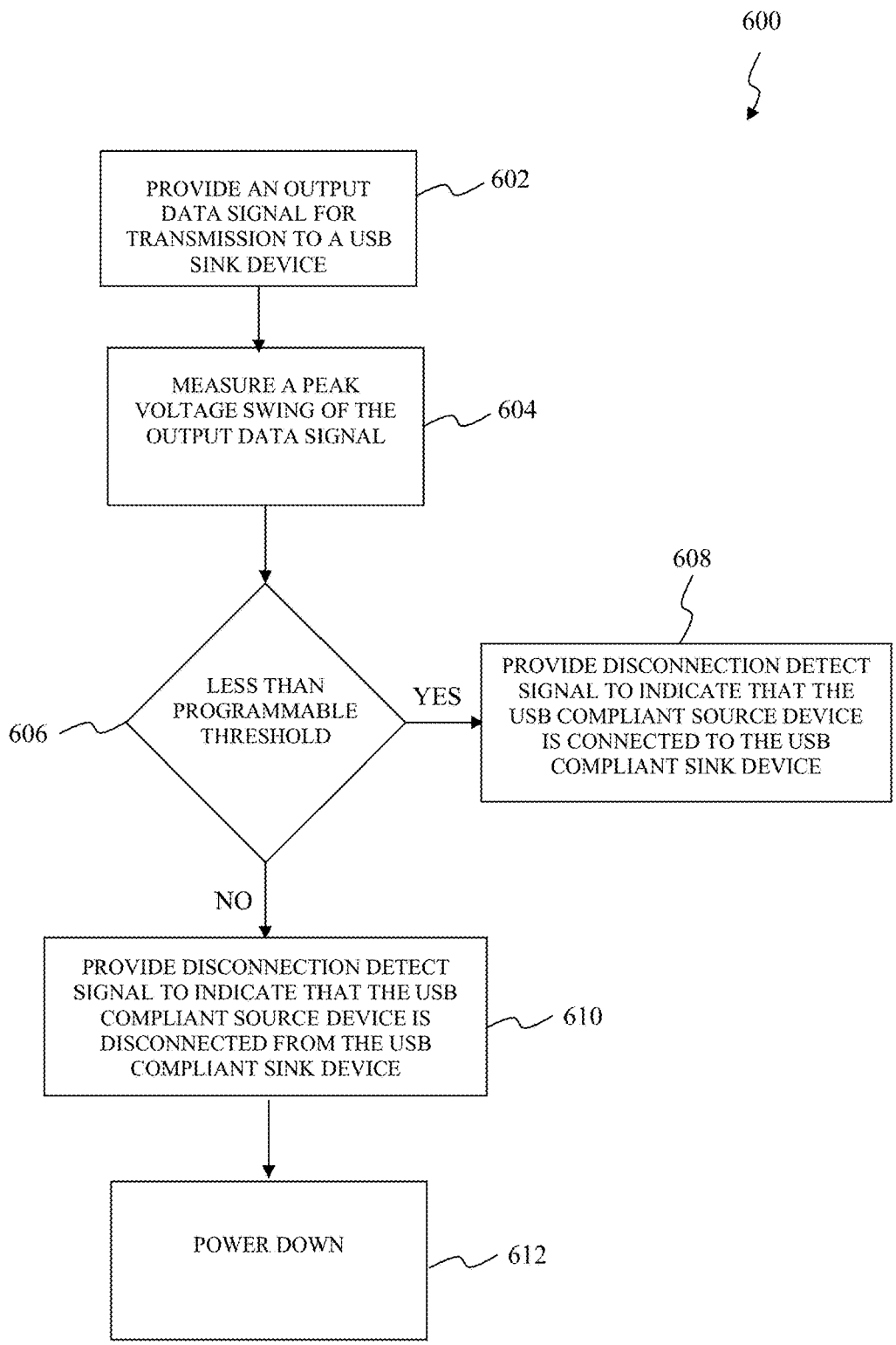
FIG. 6 illustrates a flowchart of an exemplary operation for detecting whether a twisted-pair data cable has become disconnected in accordance with various embodiments of the present disclosure.

FIG. 6 illustrates a flowchart of an exemplary operation for detecting whether a data cable has become disconnected in accordance with various embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 600 for detecting whether a data cable, such as the USB compliant data cable 206 as described above in FIG. 2A to provide an example, electrically coupling and/or mechanical connecting a USB compliant source device and a USB compliant sink device, such as the USB compliant source device 202 and the USB compliant sink device 204 as described above in FIG. 2A, to each other has become disconnected. The operational control flow 600 can be executed by disconnect detection circuitry, such as the disconnect detection circuitry as described above in FIG. 1, FIG. 2A, FIG. 3A, and/or FIG. 3B, the disconnect detection circuitry 414 as described above in FIG. 4 and/or the disconnect detection circuitry 500 as described above in FIG. 5.

At operation 602, the operational control flow 600 provides an output data signal for transmission to a USB sink device communicatively coupled to the USB source device.

At operation 604, the operational control flow 600 measures a peak voltage swing of the output data signal from operation 602. In some embodiments, the operational control flow 600 measures the peak voltage swing the output data signal 452.1(+) and/or the output data signal 452.1(−) as described above in FIG. 4 to provide some examples. In these embodiments, the operational control flow 600 can store the peak voltage swing of the output data signal from operation 602.

At operation 606, the operational control flow 600 compares the peak voltage swing of the output data signal from operation 604 with a programmable threshold. In some embodiments, the operational control flow 600 can program the programmable threshold to be approximately twice the peak voltage swing of the output data signal from operation 604. In some embodiments, the operational control flow 600 compares the peak voltage swing of the data signal to the programmable threshold to determine whether the data cable has become disconnected from the USB compliant source device or the USB compliant sink device. The operational control flow 600 proceeds to operation 608 when the peak voltage swing of the data signal is less than the programmable threshold. Otherwise, operational control flow 600 proceeds to operation 610.

At operation 608, the operational control flow 600 provides a disconnection detect signal at a first logical level to indicate that the USB compliant source device is connected to the USB compliant sink device when the peak voltage swing of the output data signal from operation 604 is less than the programmable threshold from operation 606. The operational control flow 600 has detected that the data cable has not become disconnected from the USB compliant source device or the USB compliant sink device. The data cable remains electrically coupled and/or mechanical connected to the USB source and the USB compliant sink device. In some embodiments, the operational control flow 600 sets the disconnection detect signal, such as the disconnection detect signal 454.1 or the disconnection detect signal 454.2 as described above in FIG. 4 to provide some examples, to the first logical level, for example, logical zero, to indicate that the USB compliant source device is connected to the USB compliant sink device.

At operation 610, the operational control flow 600 provides the disconnection detect signal at a second logical level to indicate that the USB compliant source device is disconnected from the USB compliant sink device when the peak voltage swing of the output data signal from operation 604 is greater than the programmable threshold from operation 606. The operational control flow 600 has detected that the data cable has become disconnected from the USB compliant source device or the USB compliant sink device. The data cable is no longer electrically coupled and/or mechanical connected to the USB source and/or the USB compliant sink device. In some embodiments, the operational control flow 600 sets the disconnection detect signal from operation 606 to the second logical level, for example, logical one, to indicate that the USB compliant source device is disconnected from the USB compliant sink device.

At operation 612, the operational control flow 600 powers down the USB source device in response to the disconnection detect signal being at the second logical level.

CONCLUSION

Embodiments of the disclosure can be implemented in hardware, firmware, software application, or any combination thereof. Embodiments of the disclosure can also be implemented as instructions stored on one or more computer-readable mediums, which can be read and executed by one or more processors. A computer-readable medium can include any mechanism for storing or transmitting information in a form readable by a computer (e.g., a computing circuitry). For example, a computer-readable medium can include non-transitory computer-readable mediums such as read only memory (ROM); random access memory (RAM); magnetic disk storage media; optical storage media; flash memory devices; and others. As another example, the computer-readable medium can include transitory computer-readable medium such as electrical, optical, acoustical, or other forms of propagated signals (e.g., carrier waves, infrared signals, digital signals, etc.). Further, firmware, software application, routines, instructions have been described as performing certain actions. However, it should be appreciated that such descriptions are merely for convenience and that such actions in fact result from computing devices, processors, controllers, or other devices executing the firmware, software application, routines, instructions, etc.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A source device for communicating with a sink device over an electrical cable, the source device comprising:
   a signal source circuit configured to provide an input data signal for transmission to the sink device; and
   a re-driver circuit configured to equalize and to amplify the input data signal to provide an output data signal for transmission to the sink device,
   wherein the re-driver circuit is further configured to:
      monitor a voltage swing of the output data signal during active communication with the sink device,
      detect a change in the voltage swing of the output data signal from a first value corresponding to a connected state to a second value corresponding to a disconnected state,
      decouple a termination resistor within the re-driver circuit in response detecting the disconnected state, and
      power down the source device in response to detecting the disconnected state.

2. The source device of claim 1, wherein the source device and the sink device are complaint with a version of a Universal Serial Bus (USB) standard or protocol.

3. The source device of claim 2, wherein the version of the USB standard comprises USB 3.x.

4. The source device of claim 1, wherein the re-driver circuit comprises:
   detection circuitry configured to provide a disconnection detect signal at a first logical level to indicate that the source device is in the connected state when the output data signal is at the first value or provide the disconnection detect signal at a second logical level to indicate that the source device is in the disconnected state when the output data signal is at the second value; and
   a logical state machine configured to cause the source device to enter into or maintain an active link state in response to the disconnection detect signal being at the first logical level or to power down the source device in response to the disconnection detect signal being at the second logical level.

5. The source device of claim 4, wherein the active link state comprises a link state U0 of a version of a Universal Serial Bus (USB) standard.

6. The source device of claim 4, wherein the logical state machine is further configured to cause the source device to enter into a power-down mode of operation to power down the source device in response to the disconnection detect signal being at the second logical level.

7. The source device of claim 1, wherein the re-driver circuit comprises a logical state machine configured to power down one or more components of the re-driver circuit in response to detecting the disconnected state.

8. A re-driver circuit that is compliant with a version of a Universal Serial Bus (USB) standard, the re-driver circuit comprising:
   a first signal pathway configured to transmit an output data signal to a USB compliant sink device in accordance with the version of the USB standard;
   a second signal pathway configured to receive an input data signal from the USB compliant sink device in accordance with the version of the USB standard; and
   a logical state machine configured to power down the re-driver circuit in response to detecting an electrical cable coupled between a USB compliant source device including the re-driver circuit and the USB compliant sink device becoming disconnected,
   wherein the first signal pathway comprises:
      detection circuitry configured to:
         measure a peak voltage swing of the output data signal during active communication with the USB compliant sink device,
         detect a change in the peak voltage swing of the output data signal from a first value corresponding to a connected state to a second value corresponding to a disconnected state, and
         decouple a termination resistor within the second signal pathway in response detecting the disconnected state.

9. The re-driver circuit of claim 8, wherein the version of the USB standard comprises USB 3.x.

10. The re-driver circuit of claim 8, wherein the detection circuitry is further configured to provide a disconnection detect signal at a first logical level to indicate that the USB compliant source device is in the connected state when the output data signal is at the first value or provide the disconnection detect signal at a second logical level to indicate that the USB compliant source device is in the disconnected state when the output data signal is at the second value.

11. The re-driver circuit of claim 10, wherein the logical state machine is further configured to cause the re-driver circuit to enter into or maintain an active link state in response to the disconnection detect signal being at the first logical level or to power down the re-driver circuit in response to the disconnection detect signal being at the second logical level.

12. The re-driver circuit of claim 11, wherein the active link state comprises a link state U0 of the version of the Universal Serial Bus (USB) standard.

13. The re-driver circuit of claim 11, wherein the logical state machine is further configured to cause the USB compliant source device to enter into a power-down mode of operation to power down the re-driver circuit in response to the disconnection detect signal being at the second logical level.

14. The re-driver circuit of claim 8, wherein the logical state machine is further configured to power down one or more components of the re-driver circuit in response to detecting the disconnected state.

15. The re-driver circuit of claim 8, wherein the first signal pathway comprises a first receiving bias circuit, a first equalizer, a first line driver, and a first transmitting bias circuit; and wherein the second signal pathway comprises a second receiving bias circuit, a second equalizer, a second line driver, and a second transmitting bias circuit.

16. A method for operating a Universal Serial Bus (USB) compliant source device, the method comprising:

providing, by the USB compliant source device, an output data signal for transmission to a USB compliant sink device communicatively coupled to the USB compliant source device;

measuring, by the USB compliant source device, a peak voltage swing of the output data signal during active communication with the USB compliant sink device;

providing, by the USB compliant source device, a disconnection detect signal at a first logical level to detect that the USB compliant source device is in the connected state or at a second logical level to detect that the USB compliant source device is in the disconnected state;

detecting, by the USB compliant source device, a change in the peak voltage swing of the output data signal from a first value corresponding to a connected state to a second value corresponding to a disconnected state; and powering down the USB compliant source device and decoupling a termination resistor of the USB compliant source device in response to detecting that the USB compliant source device is in the disconnected state.

17. The method of claim 16, further comprising entering into or maintaining, by the USB compliant source device, an active link state in response to detecting that the USB compliant source device is in the connected state.

18. The method of claim 17, wherein the active link state comprises a link state U0 of a version of a Universal Serial Bus (USB) standard.

19. The method of claim 18, wherein the version of the USB standard comprises a version USB 3.x of the USB standard or protocol.

20. The method of claim 16, wherein the powering down further comprises entering into a power-down mode of operation to power down the USB compliant source device in response to the detecting that the USB compliant source device is in the disconnected state.

* * * * *